Patented July 27, 1943

2,325,514

UNITED STATES PATENT OFFICE 2,325,514

INSECTICIDAL COMPOSITIONS CONTAINING POLYETHERAMINES

William F. Hester, Drexel Hill, Pa., assignor to Röhm & Haas Company, Philadelphia, Pa., a corporation of Delaware No Drawing. Application August 26, 1941, Serial No. 408,329

8 Claims. (Cl. 167—22)

This invention relates to insecticidal compositions containing as an active parasiticidal agent a compound of the formula $$[R(OC_nH_{2n})_x]_m NR'_{3-m}$$

wherein R is an aliphatic hydrocarbon group having one to twelve carbon atoms, $C_nH_{2n}$ represents an alkylene group in which $n$ is an integer having a value of two to four inclusive, $x$ is an integer having a value of one or more, $m$ is an integer having a value of 2 to 3 inclusive, and R' is hydrogen or a hydrocarbon group or a hydroxyalkyl group. Typical groups for R include branched, straight chain, saturated, and unsaturated groups, such as methyl, ethyl, isopropyl allyl, methallyl, isobutyl, n-butyl, amyl, hexyl, octyl, capryl, undecenyl, dodecyl, etc. In addition to hydrogen, R' may represent a hydrocarbon group such as methyl, ethyl, allyl, butyl, octyl, phenyl, benzyl, cyclohexyl, etc., or a hydroxyalkyl group, such as $-C_2H_4OH$ or $-CH_2CHOHCH_3$.

The group represented by $C_nH_{2n}$ may be an alkylene group such as $$-CH_2CH_2-$$
$$-CH_2CH_2CH_2-$$

and
$$-CH_2CH_2CH_2CH_2-$$

or a branched chain such as $-CH_2CH(CH_3)-$ or $-CH_2CH(CH_3)CH_2-$.

The open chain polyether amines of this invention may be prepared from alkoxyalkylene halides, the alkylene group of which may be interrupted by oxygen, by reaction with ammonia under pressure. The products may be distilled to separate the secondary and tertiary amines from any primary amine which may be formed. The primary amine may be returned to the reaction system as this type of primary amine is less desirable as an insecticide than the amines containing two or three ether chains. In place of ammonia there may be used a primary aliphatic, cycloaliphatic, or aryl amine, such as methylamine, ethylamine, cyclohexylamine, aniline, or the like. In this case the products having two ether-containing radicals are separated and used in insecticidal compositions.

The secondary amines forming part of the reaction products and having one ether substituent and a second substituent corresponding to that of the primary amine used may, if desired, be used in a second reaction mixture and converted to the tertiary amine having two ether-containing substituents. These secondary amines, however, also possess good insecticidal activity and their use in insecticidal compositions is described in application Serial No. 408,328, filed on even date.

Typical of the compounds which may be thus prepared are the following:

$(C_2H_5OC_2H_4OC_2H_4)_2NH$
$(C_2H_5OC_2H_4OC_2H_4)_3N$
$(C_8H_{17}OC_2H_4OC_2H_4OC_2H_4)_2NH$
$(C_8H_{17}OC_2H_4)_3N$
$(C_4H_9OCH_2CH(CH_3)O(CH_3)CHCH_2)_2NH$
$(CH_3OCH_2CH_2OCH_2CH_2OCH_2CH_2)_2NH$
$(CH_3OCH_2CH_2CH_2OCH_2CH_2CH_2)_3N$
$(CH_3OCH_2CH_2CH_2CH_2CH_2CH_2)_2NH$
$(C_5H_{11}OCH_2CH_2OCH_2CH_2OCH_2CH_2OCH_2CH_2)_3N$
$(C_3H_7OCH_2CH_2OCH_2CH_2)_2NC_2H_5$
$(C_5H_{11}OCH_2CH_2OCH_2CH(CH_3)CH_2)_2NCH_2CHOHCH_3$
$(C_6H_{13}OCH_2CH_2OCH_2CH_2)_2NCH_2C_6H_5$
$(C_4H_9OCH_2CH_2OCH_2CH_2)_2NC_6H_5$

Any one of these amines may be used in an insecticidal composition or there may also be used mixtures of the various secondary and tertiary alkoxyalkylene amines. In addition, the alkoxyalkylene amines may be used in conjunction with other insecticidal agents or with fungicidal agents.

I have found that the alkoxyalkylene amines of the above types are particularly desirable contact insecticides and ovicides. They are efficient and at the same time they impart no odor to sprays and the sprays are free from any irritating action to human beings or other animals, or to plants. While the alkoxyalkylene amines are useful in aqueous sprays, they are especially effective when applied from solvents, such as petroleum naphthas. These solutions are useful in destroying flies, fleas, mosquitoes, roaches and the like. The alkoxyalkylene amines are also useful in dormant sprays, which may contain in addition thereto emulsified oils and these sprays are particularly effective for killing the eggs of European red mite, aphis, etc.

The following examples illustrate the preparation and use of typical alkoxyalkylene amines.

Example 1

A mixture of 180 parts of butoxyethoxyethyl chloride and 34 parts of anhydrous ammonia was heated in an autoclave at 225° C. under pressure for four hours. The reaction mixture was cooled, treated with alkali, and distilled. The fraction boiling between 151° and 156° C. at 2.5 mm. pressure was found to consist essentially of $(C_4H_9OC_2H_4OC_2H_4)_2NH$. The fraction distilling between 180° and 210° C. at 2.5 mm. pressure consisted of $(C_4H_9OC_2H_4OC_2H_4)_3N$. These fractions were tested according to the standard Peet-Grady procedure as the sole toxicants in fly sprays made with a refined kerosene. A spray containing 95% of kerosene and 5% of the secondary product gave a knockdown of 97% and a kill after 24 hours of +14 compared to the Official Test Insecticide (a solution of pyrethrum equivalent to 5% pyrethrum 20:1). A similar spray containing 5% of the tertiary product gave a knockdown of 97% and a kill after 24 hours of +17 compared with the O. T. I. A mixture of 50% of each of the two products was also tested in a 5% spray giving a 97% knockdown and a kill of +16 compared to the O. T. I. A particularly significant feature of all of these sprays was that they had no more odor than the kerosene without the toxicants. The sprays caused no nasal or skin irritation to workers exposed to them.

A concentrate was prepared from 10 parts of $(C_4H_9OC_2H_4OC_2H_4)_3N$, 15 parts of the reaction product of polyglycerol and cocoanut acids (as an emulsifier), and 75 parts of a petroleum spray oil. This concentrate was diluted at 1:100 with water and applied in March as a dormant spray to apple trees which had been infested with red mites and aphids. At the end of April counts were made of the red mite eggs which had hatched and those which had been killed. A control up to 84% was obtained on different apple trees. Control with a known insecticide used for comparison in the same orchard was 60%.

The combination described above was used at 1:100 against eggs of the bean weevil with a 96% kill and against the meal worm with 100% kill. Against the meal worm at 1:200 a 95% kill was obtained.

Another concentrated spray material was prepared from 20 parts of the above compounds, 25 parts of the same emulsifier, and 55 parts of spray oil. This was applied in aqueous sprays at 1:300 to greenhouse roses infested with red spiders. Controls of 93% and 94% were obtained. No injury resulted to the plants. The same sprays applied to bean plants infested with red spiders consistently gave a 100% control.

*Example 2*

A mixture of 225 parts of a butoxyethoxyethyl bromide and 60 parts of methylamine was heated in an autoclave at 225–250° C. for about four hours. The reaction product was cooled, treated with alkali, and distilled. The fraction distilling between 140° C. and 150° C. at 3 mm. pressure corresponded in composition to $(C_4H_9OC_2H_4OC_2H_4)_2NCH_3$ It was tested in a fly spray with kerosene as the vehicle according to standard methods. A knockdown of 97% was obtained and a kill of +5 against the O. T. I. Dispersed in a spray at 1 lb. per 100 gallons an 80% control of bean beetle larvae was obtained.

A similar product is obtained by substituting an equivalent amount of aniline for the methylamine. The di(butoxyethoxyethyl)phenyl amine distilled between 215° C. and 220° C. at 3.5 mm. pressure. An aqueous spray containing 0.5% of this material gave 100% control of Mexican bean beetle larvae on bean plants and a 73% control at 1 lb. per 100 gallons of spray.

Another similar product was prepared from cyclohexyl amine and butoxyethoxyethyl chloride. The resulting tertiary amine boiled at 125–150° C. at 2.5 mm. It showed particular effectiveness against aphids and bean beetle larvae.

*Example 3*

Two parts of the mixture of 50% each of $(C_4H_9OC_2H_4OC_2H_4)_2NH$ and $(C_4H_9OC_2H_4OC_2H_4)_3N$ was combined with three parts of pyrethrum (20:1) extract, diluted with kerosene to 100 parts, and tested against flies by the Peet-Grady technique. A knockdown of 97% was obtained and a kill of +30 compared to the O. T. I.

One part of the mixture of amines and four parts of the pyrethrum extract in 100 parts of fly spray gave a knockdown of 99% and a kill of +21 compared to the O. T. I. Three parts of the amine mixture with three parts of pyrethrum extract in 100 parts of fly spray gave a knockdown of 99% and a kill of +30 compared to the O. T. I.

*Example 4*

The mixture of the secondary and tertiary amines shown above was tested against roaches. A 1% solution gave a kill of +2 compared to the O. T. I. (5% pyrethrum 20:1) while a 2% solution of the mixed amines gave a kill of +17 and 8% a kill of +28.

*Example 5*

A mixture of methyl alcohol, chloroethyl ether, sodium hydroxide, and water was heated at 80° C. for 24 hours, cooled, filtered, and fractionated. From the distillates there were taken the fractions which contained about the correct chlorine contents for $CH_3OC_2H_4OC_2H_4Cl$. These fractions were combined to give 139 parts of intermediate which was heated in an autoclave at 225° C. with 34 parts of anhydrous ammonia. The reaction product was treated with 77 parts of 52% sodium hydroxide solution and 150 parts of water and extracted three times with benzene. Finally the product was carefully distilled. The fraction boiling between 95° C. and 135° C. at 2 mm. contained essentially $(CH_3OC_2H_4OC_2H_4)_2NH$, and the fraction boiling between 161° and 165° C. at 2 mm. contained essentially $(CH_3OC_2H_4OC_2H_4)_3N$.

Without further purification these fractions were made into a 5% fly spray and tested by the Peet-Grady procedure. The knockdown obtained with the secondary product was 56% and the kill in 24 hours −12 compared to the O. T. I. The tertiary amine gave a kill of −9 and a knockdown of 65%. Both fly sprays were free from odor or irritation.

*Example 6*

To a mixture of 74.6 parts of triethanolamine and 60 parts of sodium hydroxide there was added 270 parts of butoxyethoxy ethyl chloride and the mixture was heated for two hours at 120° C.–130° C. on an oil bath under a reduced pressure of about 60 mm. As water formed in the reaction, it was removed. The reacted mixture was cooled, washed with water, separated, dried over sodium sulfate and distilled under reduced pressure. The fraction distilling between 225° and 230° C.. under 3 mm. pressure, consisting of 46 parts, corresponded in composition to $(C_4H_9OC_2H_4OC_2H_4OC_2H_4)_2NC_2H_4OH$. It contained by analysis 3.12% of nitrogen.

This fraction was taken up in kerosene to prepare a fly spray which was adjusted to a 5% concentration of the above product. By the Peet-Grady test this spray gave an 86% knockdown and a kill of −5 against the O. T. I.

Example 7

A mixture of 82 parts of triethanolamine, 66 parts of sodium hydroxide, and 318 parts of normal octyl bromide was heated at 130°–140° C. on an oil bath for four hours. The reaction mixture was then cooled, washed with water, dried over sodium sulfate, and distilled under reduced pressure. A fraction distilling between 165° C. and 185° C. at 3 mm. pressure was chiefly $(C_8H_{17}OC_2H_4)_2NC_2H_4OH$ with a small amount of the mono-octyloxyethyl ethanolamine. The fraction distilling between 185° C. and 205° C. was practically pure bisoctyloxyethyl ethanolamine. These products in a series of tests gave knockdowns of 74 to 77% and kills from −14 to −5 against the O. T. I.

By methods generally similar to those described above, there may be prepared a great variety of aliphatic oxyalkylene amines which are secondary or tertiary. In contrast thereto the corresponding primary amines appear to be less effective and are not sufficiently free from odor and irritation. The secondary and tertiary ether amines provide a wide variety of ether amines from which one or more members may be selected for any particular insecticidal or ovicidal purpose. The most available compounds are those containing ethylene ether groups and of these the ether amines having a terminal aliphatic group of 3 to 8 carbon atoms and 2 to 4 oxyethyl groups are preferred. It is also preferred in the case of those tertiary amines having two alkoxyalkylene groups that the third N-substituent have not over seven carbon atoms.

The alkoxyalkylene secondary and tertiary amines have an unusual balance of desirable properties. They give a high knockdown and a good kill, yet they are practically odorless in sprays and are free from irritating effects. Compared to non-ether amines, they have an improved knockdown and they are definitely superior in regard to odor and irritation. They have a further advantage in acting as blending agents for improving the solubility of other insecticidal materials in sprays and in improving penetration into insects and into eggs. They may be used as the sole toxic agent of the insecticidal composition or they may be mixed with other insecticides such as pyrethrum, rotenone, derris extracts, nicotine, organic thiocyanates, etc.

I claim:

1. Insecticidal and ovicidal compositions having as an active ingredient a compound of the formula $[R(OC_nH_{2n})_x]_mNR'_{3-m}$ wherein R is an aliphatic hydrocarbon group of less than 13 carbon atoms, $C_nH_{2n}$ represents an alkylene group in which $n$ is an integer having a value of two to four inclusive, $x$ is an integer of at least one, $m$ is an integer having a value of two to three inclusive, and R' is a member of the class consisting of hydrogen, hydroxyalkyl, and hydrocarbon groups.

2. Insecticidal and ovicidal compositions having as an active ingredient a compound of the formula $[R(OC_nH_{2n})_x]_mNR'_{3-m}$ wherein R is an aliphatic hydrocarbon group of less than 13 carbon atoms, $n$ and $x$ are integers having values of two to four inclusive, $m$ is an integer having a value of two to three inclusive, and R' is a hydrocarbon group of not over seven carbon atoms.

3. Insecticidal and ovicidal compositions having as an active ingredient a compound of the formula $[R(OC_nH_{2n})_x]_mNH_{3-m}$ wherein R is an aliphatic hydrocarbon group of three to eight carbon atoms, $n$ and $x$ are integers having values of two to four inclusive, and $m$ is an integer having a value of two to three inclusive.

4. Insecticidal and ovicidal compositions having as an active ingredient a compound of the formula $[R(OC_nH_{2n})_x]_2NH$ wherein R is an alkyl group of three to eight carbon atoms, and $n$ and $x$ are integers having values of two to four inclusive.

5. Insecticidal and ovicidal compositions having as an active ingredient a compound of the formula $[R(OC_nH_{2n})_x]_3N$ wherein R is an alkyl group of three to eight carbon atoms, and $n$ and $x$ are integers having values of two to four inclusive.

6. An insecticidal and ovicidal composition having as an active ingredient a compound of the formula $(C_4H_9OCH_2CH_2OCH_2CH_2)_mNH_{3-m}$ wherein $m$ is an integer having a value of two to three inclusive.

7. An insecticidal and ovicidal composition having as an active ingredient a compound of the formula $(C_4H_9OCH_2CH_2OCH_2CH_2)_2NH$ 8. An insecticidal and ovicidal composition having as an active ingredient a compound of the formula $(C_4H_9OCH_2CH_2OCH_2CH_2)_3N$

WILLIAM F. HESTER.